(12) United States Patent
Zhang et al.

(10) Patent No.: US 7,277,698 B2
(45) Date of Patent: Oct. 2, 2007

(54) PROXY FOR CALLS TO ROAMING SUBSCRIBER AND PROXY METHOD FOR CALLS TO ROAMING SUBSCRIBER

(75) Inventors: Wenlin Zhang, Shenzhen (CN); Lixin Sun, Shenzhen (CN)

(73) Assignee: Huawei Technologies Co., Ltd., Nanshan District, Shenzhen Guangdong Province (CN)

( * ) Notice: Subject to any disclaimer, the term of this patent is extended or adjusted under 35 U.S.C. 154(b) by 28 days.

(21) Appl. No.: 11/086,736

(22) Filed: Mar. 18, 2005

(65) Prior Publication Data

US 2005/0192006 A1    Sep. 1, 2005

(30) Foreign Application Priority Data

Sep. 19, 2002   (CN) .................................. 02 1 29228
Sep. 12, 2003   (WO) ..................... PCT/CN03/00772

(51) Int. Cl.
*H04M 3/42*  (2006.01)
(52) U.S. Cl. .................. 455/417; 455/428; 455/445; 455/432.1; 455/432.2; 455/435.1
(58) Field of Classification Search ................ 455/445, 455/417, 428, 432.1, 432.2, 435.1
See application file for complete search history.

(56) References Cited

U.S. PATENT DOCUMENTS

| | | | |
|---|---|---|---|
| 5,369,684 A | 11/1994 | Buhl et al. | |
| 5,440,614 A | 8/1995 | Sonberg et al. | |
| 5,884,179 A | 3/1999 | Patel et al. | |
| 6,684,072 B1 * | 1/2004 | Anvekar et al. | 455/432.1 |
| 6,826,397 B1 * | 11/2004 | Vasa | 455/417 |
| 6,871,072 B1 * | 3/2005 | Meche | 455/445 |
| 2001/0002364 A1 * | 5/2001 | Lahtinen | 455/445 |

FOREIGN PATENT DOCUMENTS

| | | |
|---|---|---|
| CN | 02129228.0 | 9/2002 |
| CN | 1468009 A | 1/2004 |
| WO | WO 97/29609 | 8/1997 |
| WO | WO 97/36437 | 10/1997 |
| WO | WO 00/22863 | 4/2000 |
| WO | WO 02/13567 A1 | 2/2002 |
| WO | PCT/CN2003/000772 | 9/2003 |
| WO | WO 2004/028172 A1 | 4/2004 |

\* cited by examiner

*Primary Examiner*—Joseph Feild
*Assistant Examiner*—Huy D Nguyen
(74) *Attorney, Agent, or Firm*—J. Harold Nissen; Lackenbach Siegel, LLP (57) ABSTRACT

A Proxy for calls to a roaming subscriber CRP including a voice bear and a signaling management module, a call access control module, a message processing module, and a waiting call data storage module; and a proxy method for calls to a roaming subscriber including initiating a request to the CRP; the CRP informs the roaming subscriber to call back; and then accomplishing the call switching for the calling subscriber and the called subscriber; and with the afore-mentioned device and method, both the calling subscriber and the called subscriber in this call actually act as a calling party from the viewpoint of the CRP, to avoid unnecessary long distance call costs for both parties and improving communication quality for roaming subscribers.

11 Claims, 6 Drawing Sheets

PROXY FOR CALLS TO ROAMING SUBSCRIBER AND PROXY METHOD FOR CALLS TO ROAMING SUBSCRIBER

FIELD OF THE INVENTION

The present invention relates to the mobile communication field, particularly to a CRP (the Proxy for Calls to a Roaming Subscriber) and a proxy method for calls to a roaming subscriber.

FIELD OF THE INVENTION

Presently, with the existing routing solution for roaming mobile telephones in the mobile networks, a voice bear has to be established between the mobile network in the home region and that in the visit region to support calls of a mobile subscriber in roaming state. Since the communication route is very long and the network resources are occupied severely, the call quality of roaming service is degraded greatly; in addition, the cost of the calls in roaming state is much higher than that in a state excluding roaming. Especially, for a subscriber in international roaming state, any call to the subscriber is an international long-distance call, i.e., that call has to be accomplished through a voice bear between the mobile network in the home country and that in the visit country; therefore, the subscriber has to pay the charge for international long-distance call between the home country and the visit country, even though the calling party is within a stone throw to the roaming subscriber (e.g., a companion in the same tourist party, or a mobile subscriber or fixed subscriber in the visit country), the voice bear has to be established to the home country and then detours. The international long-distance connection results in degraded call quality; in addition, the subscriber has to pay double charge for the international long-distance calls. Though the SOR (support of optimal route) method in GSM and 3GPP provide a solution, it requires modification to a large amount of network devices as well as coordination between network devices of operators in different countries. Therefore, the method is not used substantially at present.

SUMMARY OF THE INVENTION

An object of the present invention is to provide a CRP (the Proxy for Calls to a Roaming Subscriber), through which the calls to a roaming subscriber can be accomplished.

The CRP of the present invention comprises: a voice bear and signaling management module, a call access control module, a message processing module, and a waiting call data storage module;

said voice bear and signaling management module receives a call request signaling from another network element and sends the signaling to the call access control module, which stores the call-relevant information into the waiting call data storage module and requests the message processing module to initiate a callback acknowledgement message to the called subscriber; the message processing module sends a callback acknowledgement message to the called subscriber, and the call access control module accomplishes the call switching.

Said CRP also comprises a terminal input device, which is connected with the message processing module and designed to configure the content of the callback acknowledgement message.

The method of the present invention comprises: initiating a request to the Proxy for Calls to a Roaming subscriber, CRP; said CRP informing the roaming subscriber to call back; and then accomplishing the call switching for the calling subscriber and the called subscriber.

Said proxy method for calls to a roaming subscriber further comprises the following steps:

a. the roaming subscriber initiating a proxy service request for a call to the roaming subscriber to the CRP;

b. the CRP, after receiving the service request, storing the relevant information into the waiting call data storage module, and sending a callback acknowledgement message to the called subscriber;

c. the called subscriber calling back the CRP after receiving the callback acknowledgement message;

d. the CRP accessing the call from the called subscriber, determining the calling subscriber corresponding to the called subscriber according to the data stored in the waiting call data storage module, connecting a voice bear between the calling and the called subscribers, and correlating the call-relevant information from the calling and the called subscribers as a call to manage.

The proxy service request for calls to the roaming subscriber in step a may be accomplished by initiating a call request from the calling subscriber directly.

The call may be accomplished by dialing "the special service number of the CRP+the called number".

If the called subscriber is an international roaming subscriber, a prefix of international dialing number and the home country code in which the called subscriber is registered need to be dialed before the called number.

The proxy service request for calls to the roaming subscriber in step a may be accomplished by sending a call subscription message.

Said sending the call subscription message is accomplished by Unstructured Supplementary Service Data, USSD.

Said sending the call subscription message is accomplished by short message.

The callback request message in step b comprises an indication, which indicates the way in which the called subscriber dials the calling subscriber.

In said proxy method for calls to a roaming subscriber, the callback number used by the called subscriber, after he/she receives the callback request message is the special service number of said CRP.

In said proxy method for calls to a roaming subscriber, the callback number used by the called subscriber, after he/she receives the callback request message is the special service number of said CRP+a number instructed by the system.

Said number instructed by the system represents an identification number of the call request that is assigned by the system or other indication that can be recognized by the CRP.

In said step d, if there is no call connection from the calling subscriber to the CRP, a connection may be established through the following steps:

d1. the CRP determining whether the calling subscriber can accept direct call; if so, the CRP calling the calling subscriber directly to establish a call connection; otherwise going to step d2;

d2. the CRP sending a callback request message to the calling subscriber;

d3. the calling subscriber, after receiving the request message, calling back the CRP;

d4. the CRP accessing the call from the calling subscriber and establishing a call connection.

With above device and method, the roaming subscriber being as the called party can be avoided, unnecessary long-distance call cost for the calling and the called subscribers can be saved and the call quality for roaming subscribers can be improved.

DETAILED DESCRIPTION OF THE EMBODIMENTS

The detailed embodiments of the present invention will be hereinafter described with reference to the attached drawings.

Figure 1:
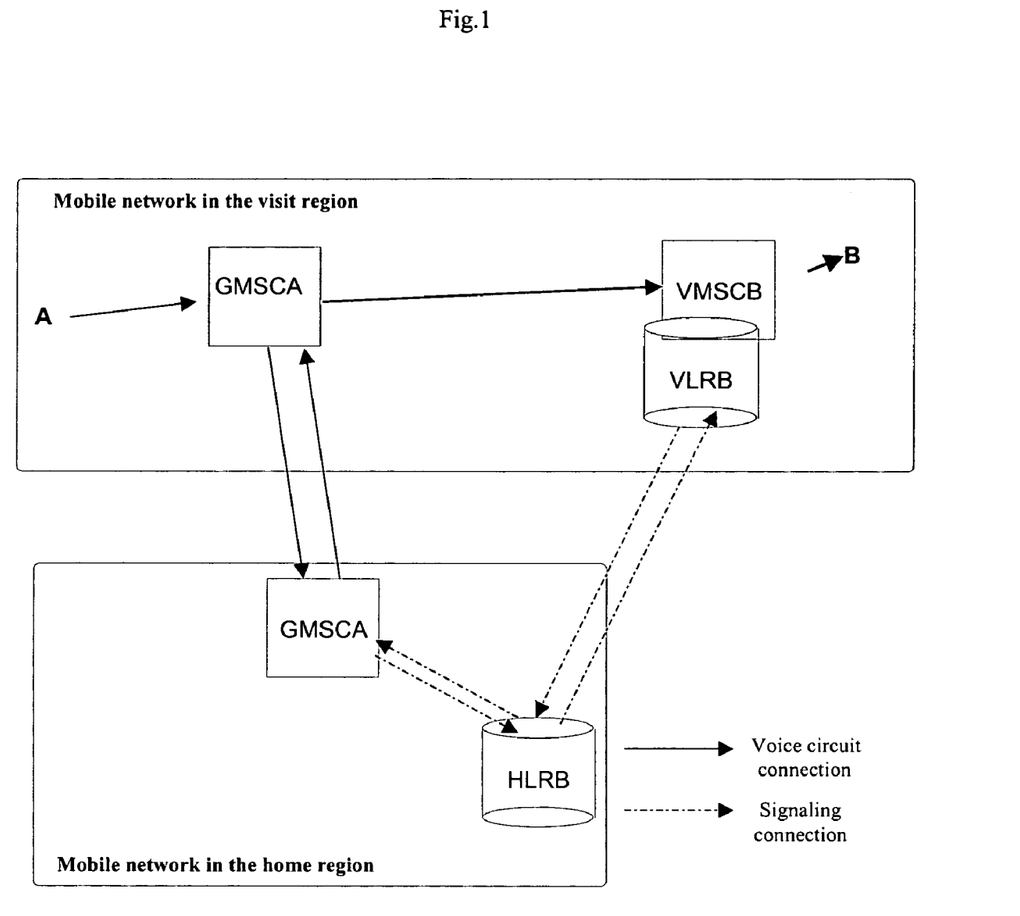
FIG. 1 is a schematic diagram of call routing to a roaming subscriber in the prior art.
Figure 2:
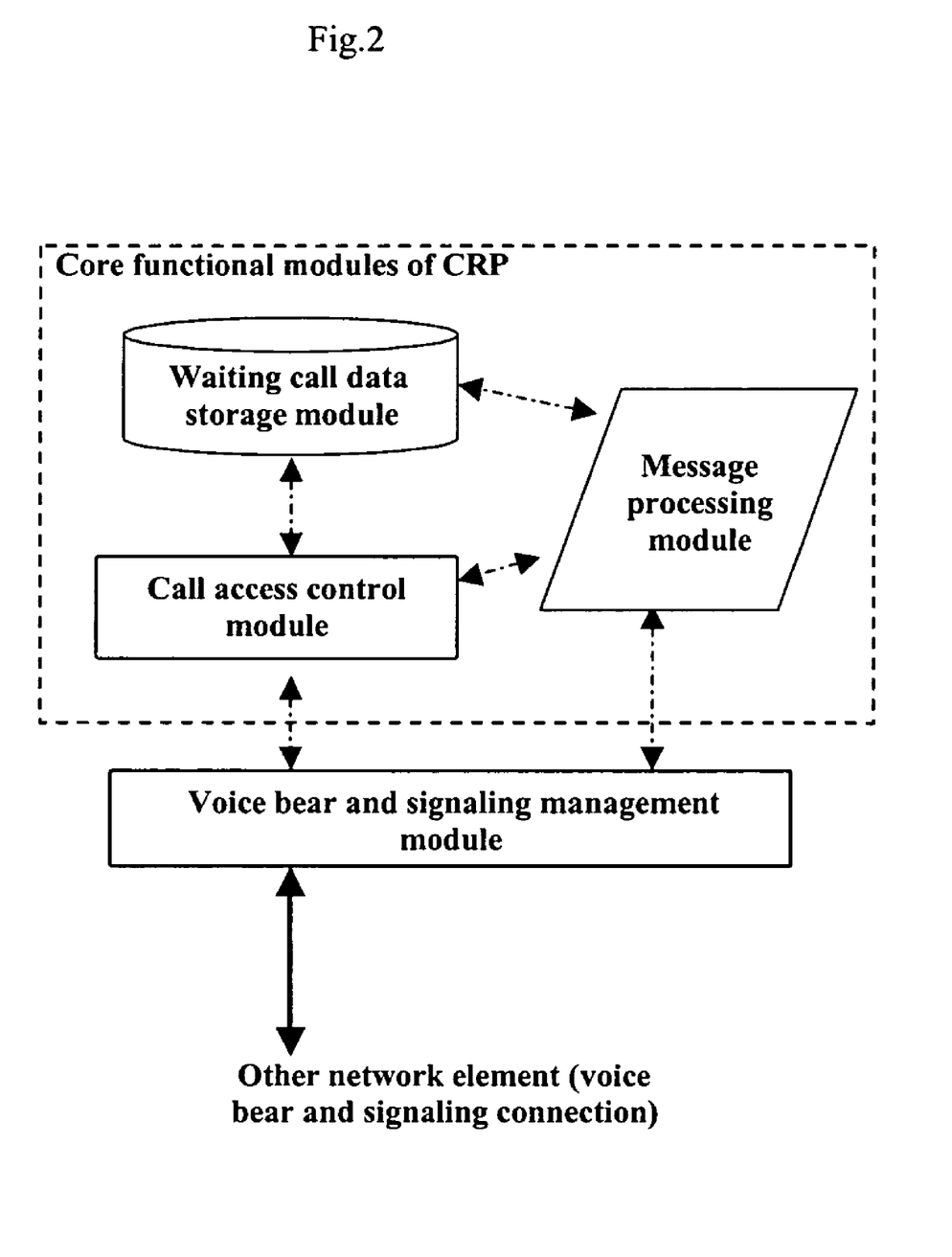
FIG. 2 is a structural diagram of the CRP according to the present invention.

FIG. 2 is a structural diagram of the CRP according to the present invention; as shown in FIG. 2, CRP mainly comprises the following parts:

a voice bear and signaling management module, which is responsible for signaling and voice bear connection with other network elements and to manage the signaling and voice bears;

a call access control module, which is designed to control a call access, comprising: accessing a call from a calling subscriber, i.e., storing call-relevant information into a waiting call data storage module, and requesting a message processing module to send a callback acknowledgement message to the called subscriber; the called subscriber, when calling back, comparing the International Mobile Subscriber Identity (IMSI) of the called subscriber by searching in the waiting call data storage module, connecting with the corresponding waiting calling subscriber, accessing the call, and creating statistical information related to the call and a call ticket;

a message processing module, which functions: (1) sending the callback acknowledgement message, which contains the calling number and necessary acknowledgement information, to the called subscriber, so that the called subscriber can identify the calling subscriber and can call back the CRP conveniently; (2) receiving the call request message from the calling subscriber, analyzing the message, storing the information of the calling subscriber and the called subscriber into the waiting call data storage module, and sending the callback acknowledgement message to the called subscriber;

a waiting call data storage module, which is connected with the message processing module and the call access control module and is designed to store the waiting call-relevant information, which comprises the IMSI of the calling subscriber, the IMSI of the called subscriber, wait timer, etc.; clearing up the information after the call is accessed successfully or switching timeout.

Said voice bear and signaling management module receives call request signaling from other network elements and sends the signaling to the call access control module, which stores the call-relevant information into the waiting call data storage module and requests the message processing module to send a callback acknowledgement message to the called subscriber; the message processing module then sends a callback acknowledgement message to the called subscriber, the call access control module accomplishes the call switching.

Said CRP also comprises a terminal input device, which is connected to the message processing module and designed to configure the content of the callback acknowledgement message.

Figure 3:
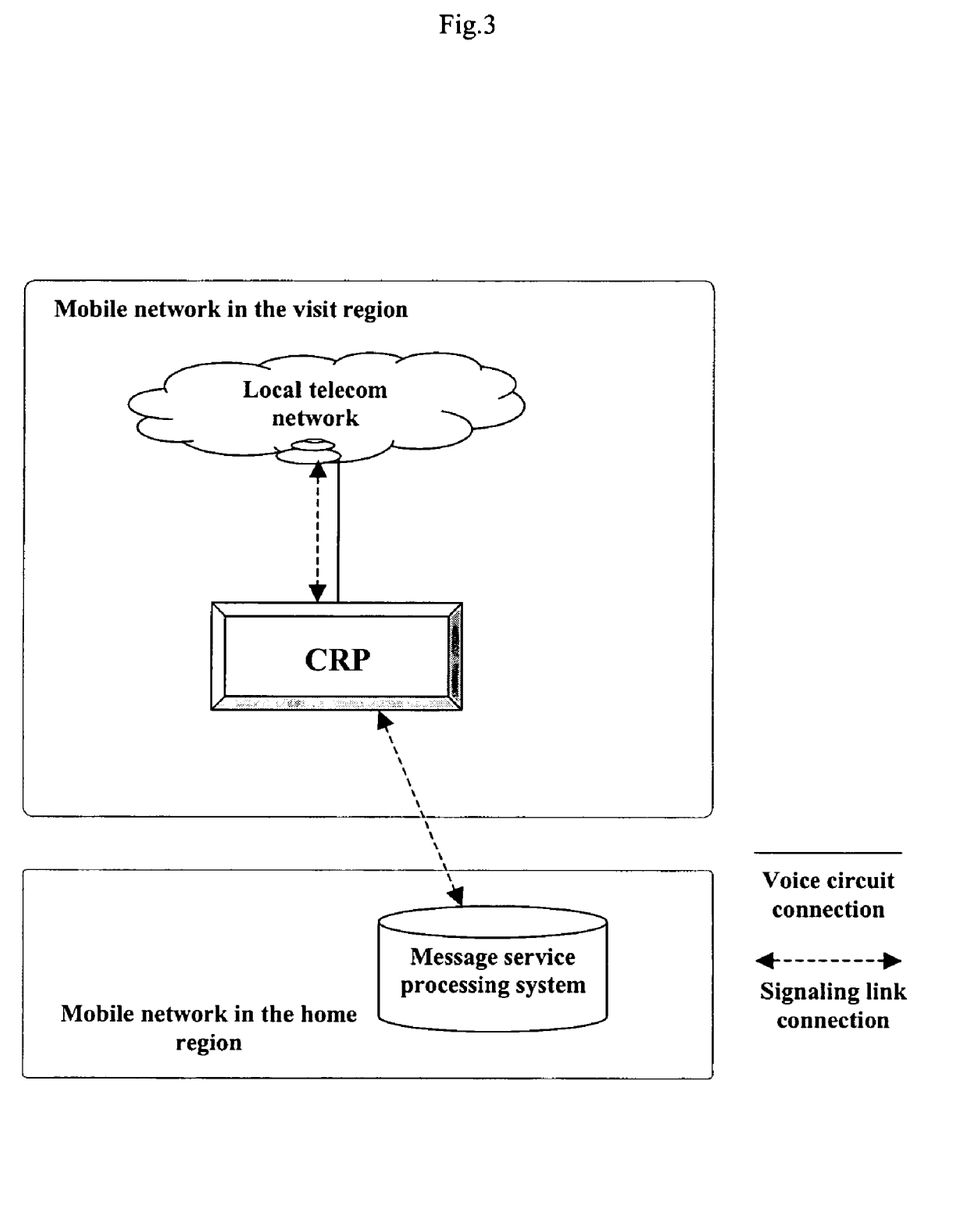
FIG. 3 is a schematic diagram of the network connection of the CRP according to the present invention.

FIG. 3 is a schematic diagram of the network connection of the CRP according to the present invention. As shown in FIG. 3, the CRP is connected with the local network by voice bear and signaling, and is connected to a message service processing system, (e.g., the Short Message Center hereinafter referred to as SMC, or the USSD Center, etc.) by signaling link. Wherein, the message service processing system refers to a device that controls and processes the message service in the current network (such as the SMC, or the USSD Center, etc.) and communicates with the telecom network and the application providing device directly, so that a message transmitted to the MSC will be controlled, processed, and then transmitted to an application or another subscriber via the telecom network. An message sent from a subscriber may be transmitted to the MSC via the telecom network, controlled and processed at the MSC, and then transmitted to the destination (an application or another subscriber); an application may also send a message to a subscriber via the MSC.

Figure 4:
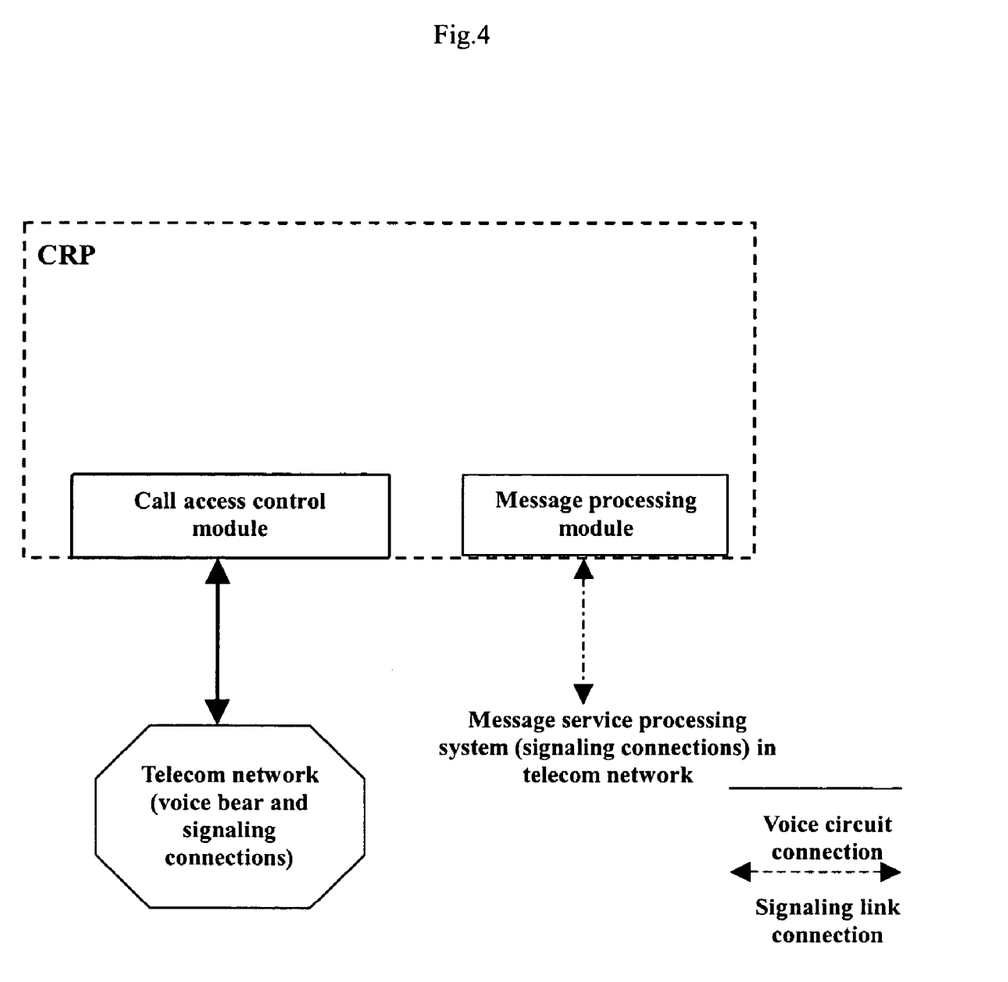
FIG. 4 shows major external connections of internal modules of the CRP according to the present invention.

FIG. 4 is a schematic diagram of the external connections of the internal modules of CRP according to the present invention.

The proxy method for calls to a roaming subscriber according to the present invention comprises: initiating a request to the CRP, which requests the roaming subscriber to call back to it, and switches the call for the calling subscriber and the called subscriber, so that both the calling and the called subscriber are both calling parties when viewed from the CRP; thus the roaming subscriber being as the called party is avoided.

Suppose a subscriber B roams into a region where a subscriber A is registered in, and the subscriber A wants to call the subscriber B, the call process will comprise the following steps with the proxy method for calls to a roaming subscriber according to the present invention:

a. the subscriber A in the visit region initiating a proxy service request for a call to the roaming subscriber to the CRP;

b. the CRP, after receiving the service request from the subscriber A in the visit region, sending a callback request message to the message service processing system which provides service for the called subscriber; the message service processing system obtaining location information of the called subscriber and then sending a message to a switching node VMSC/VLRB which provides service for the called subscriber, and to the called subscriber B finally;

c. the called subscriber B calling back the CRP after receiving the message;

d. the Mobile Switching Center MSC sending the call to the CRP, which accesses the call from the subscriber B, searches in the waiting call data storage module, and connects voice bear A and voice bear B.

In step b, the callback request message contains the indication which indicates the way in which the called subscriber dialed the calling subscriber.

The indication may be one of the following cases as determined by CRP:

dialing the special service number of CRP, or the special service number+a given indication number, or the special service number+the calling number directly.

in above step a, the proxy service request for a call to the roaming subscriber may be implemented in several ways; for example, the calling subscriber initiates the call request directly, or the calling subscriber sends a call subscription message; if the proxy service request is implemented by sending a call subscription message, it may be accomplished by USSD or SMS.

In above step d, if there is no call connection between the calling subscriber and the CRP, a connection may be established through the following steps:

d1. the CRP determining whether the calling subscriber can accept direct call; if so, the CRP calling the calling subscriber directly to establish a call connection; otherwise going to step d2;

d2. the CRP sending a callback request message to the calling subscriber;

d3. the calling subscriber, after receiving the request message, calling back the CRP;

d4. the CRP accessing the call from the calling subscriber and establishing a call connection.

Figure 5:
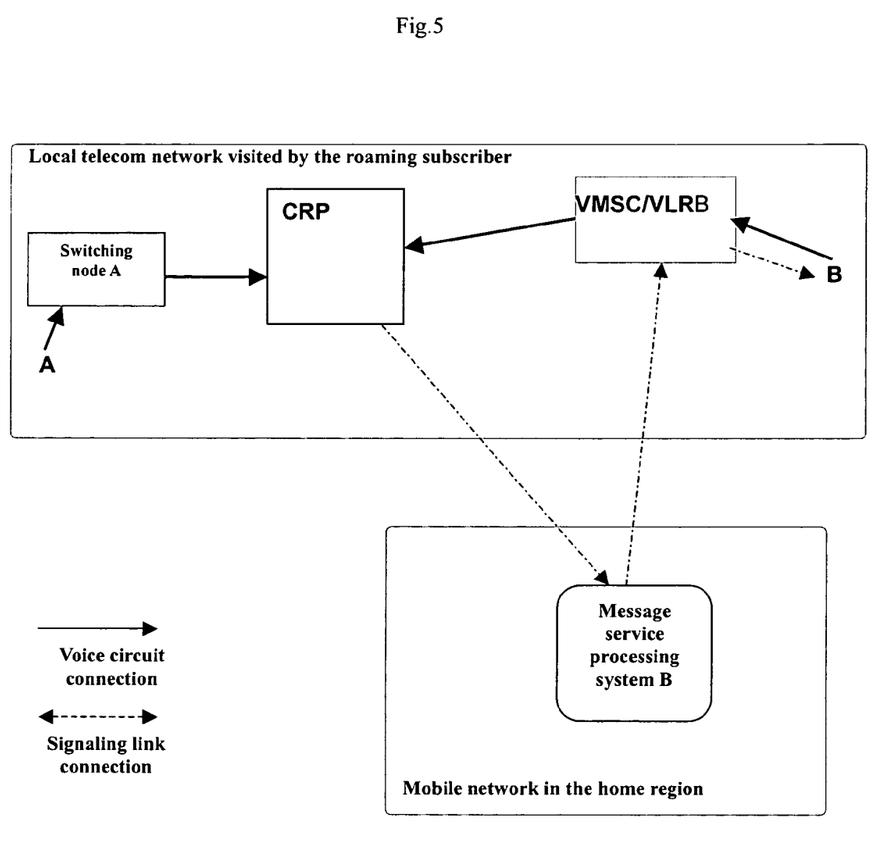
FIG. 5 shows the call process through which a calling subscriber using CRP service calls the CRP directly.

FIG. 5 shows the call process through which the subscriber A calls the subscriber B by call. As shown in FIG. 5, in the practical network, the network nodes related with the method of the present invention include: a switching node and a VMSC/VLRB. Wherein, the switching node is a device that accomplishes signaling and voice bear switching in the telecom network; the VMSC/VLRB is a mobile service switching node VMSC/VLR that provides service for the subscriber B.

In this embodiment, the subscriber A may initiate the request by call (i.e., dialing the special service number of CRP+the called number). If the called subscriber is an international roaming subscriber, a prefix of international dialing number and the home country code in which the called subscriber is registered need to be dialed before the called number.

Figure 6:
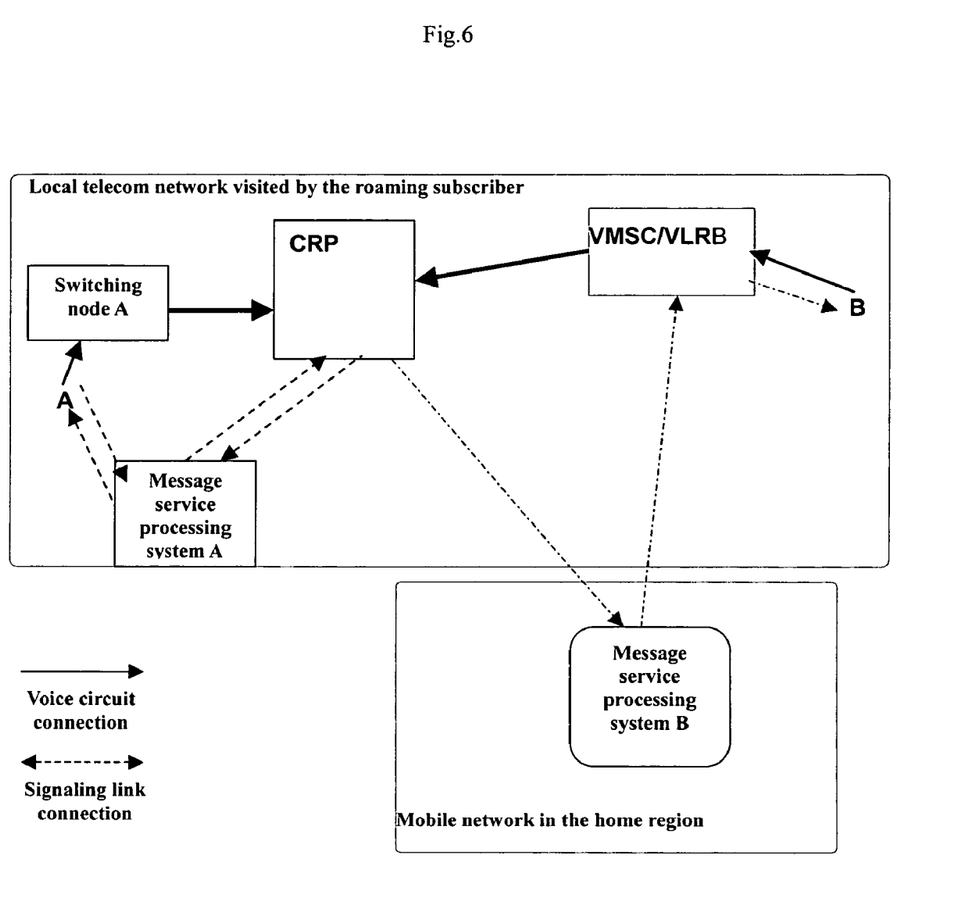
FIG. 6 shows the call process through which a calling subscriber using CRP service subscribes a call to the CRP by message.

As shown in FIG. 6, the subscriber B initiates the request to the CRP to call subscriber A by message. It can be seen that if the subscriber subscribes the call from CRP through sending a message, that message has to be sent to the message service processing system, which will send a call subscription message to CRP.

The relevant data in the waiting call data storage module will be cleared up after the call is switched successfully or switching timeout.

The present accomplish call access to the roaming subscriber by introducing a CRP in the traditional mobile communication systems. It provides a device and a method that can avoid detour to the home region while having no special requirement for the traditional network devices, so as to improve call quality of the roaming subscriber and save unnecessary long-distance call cost for the calling subscriber and the called subscriber.

Though the present invention is described with above preferred embodiments, it is understood the protection scope of the present invention is not defined by the embodiments. Those skilled in the art may easily make modifications or replacements within the disclosure of the present invention; however, any such modification or replacement shall be deemed as falling into the protection scope of the present invention. Therefore, the protection scope is only defined by the claims.

The invention claimed is:

1. A proxy method for calls to a called subscriber, wherein the called subscriber is roaming in a visit network, comprising the following:

initiating, by a calling subscriber in the visit network, a proxy service request for a call to the called subscriber to a proxy for calls to a roaming subscriber CRP;

storing the relevant information in a waiting call data storage module in the CRP, in response to the proxy service request;

sending a callback inform message to the called subscriber;

calling back the CRP by the called subscriber in response to the callback inform message;

in response to the call from the called subscriber, determining the calling subscriber according to the data stored in the waiting call data storage module in the CRP;

establishing a voice bear between the calling and the called subscribers;

correlating the call-relevant information from the calling and the called subscribers; and wherein the proxy service request for calls to the roaming subscriber in the initiating step is accomplished by sending a call subscription message.

2. The proxy method for calls to called subscriber according to claim 1, wherein the proxy service request for calls to the called subscriber in step a is accomplished by initiating a call request from the calling subscriber directly.

3. The proxy method for calls to a called subscriber according to claim 2, wherein the call is accomplished by dialing "the special service number of the CRP+ the called number".

4. The proxy method for calls to a called subscriber according to claim 2, wherein if the called subscriber is an international roaming subscriber, a prefix of international dialing number and the home country code in which the called subscriber is registered need to be dialed before the called number.

5. The proxy method for calls to a called subscriber according to claim 4, wherein said sending the call subscription message is accomplished by Unstructured Supplementary Service Data, USSD.

6. The proxy method for calls to a called subscriber according to claim 4, wherein said sending the call subscription message is accomplished by short message.

7. A proxy method for calls to a called subscriber, wherein the called subscriber is roaming in a visit network, comprising the following:

initiating, by a calling subscriber in the visit network, a proxy service request for a call to the called subscriber to a proxy for calls to a roaming subscriber CRP;

storing the relevant information in a waiting call data storage module in the CRP, in response to the proxy service request;

sending a callback inform message to the called subscriber;

calling back the CRP by the called subscriber in response to the callback inform message;

in response to the call from the called subscriber, determining the calling subscriber according to the data stored in the waiting call data storage module in the CRP;

establishing a voice bear between the calling and the called subscribers;

correlating the call-relevant information from the calling and the called subscribers; and the callback inform message in the sending step comprises an indication, which indicates the way in which the called subscriber dials the calling subscriber.

8. The proxy method for calls to a called subscriber according to claim 7, wherein the callback number used by the called subscriber, after he/she receives the callback inform message is the special service number of said CRP.

9. The proxy method for calls to a called subscriber according to claim 7, wherein the callback number used by the called subscriber, after he/she receives the callback inform message is the special services number of said CRP+ a number instructed by the system.

10. The proxy method for calls to a called subscriber according to claim 9, wherein said number instructed by the system represents an identification number of the call request that is assigned by the system or other indication that can be recognized by the CRP.

11. A proxy method for calls to a called subscriber, wherein the called subscriber is roaming in a visit network, comprising the following:

initiating, by a calling subscriber in the visit network, a proxy service request for a call to the roaming subscriber to a proxy for calls to a roaming subscriber CRP;

storing the relevant information in a waiting call data storage module in the CRP, in response to the proxy service request;

sending a callback inform message to the called subscriber;

calling back the CRP by the called subscriber in response to the callback inform message;

in response to the call from the called subscriber, determining the calling subscriber according to the data stored in the waiting call data storage module in the CRP;

establishing a voice bear between the calling and the called subscribers; and correlating the call-relevant information from the calling and the called subscribers;

wherein, in said establishing step, if there is no call connection from the calling subscriber to the CRP, when the calling subscriber can accept direct call, the CRP calling the calling subscriber directly to establish a call connection;

when the calling subscriber cannot accept direct call, the CRP sending a callback request message to the calling subscriber;

in response to the callback request message, calling back the CRP by the calling subscriber; and accessing the call from the calling subscriber and establishing a call connection between the calling subscriber and the called subscriber by the CRP.

* * * * *